UNITED STATES PATENT OFFICE.

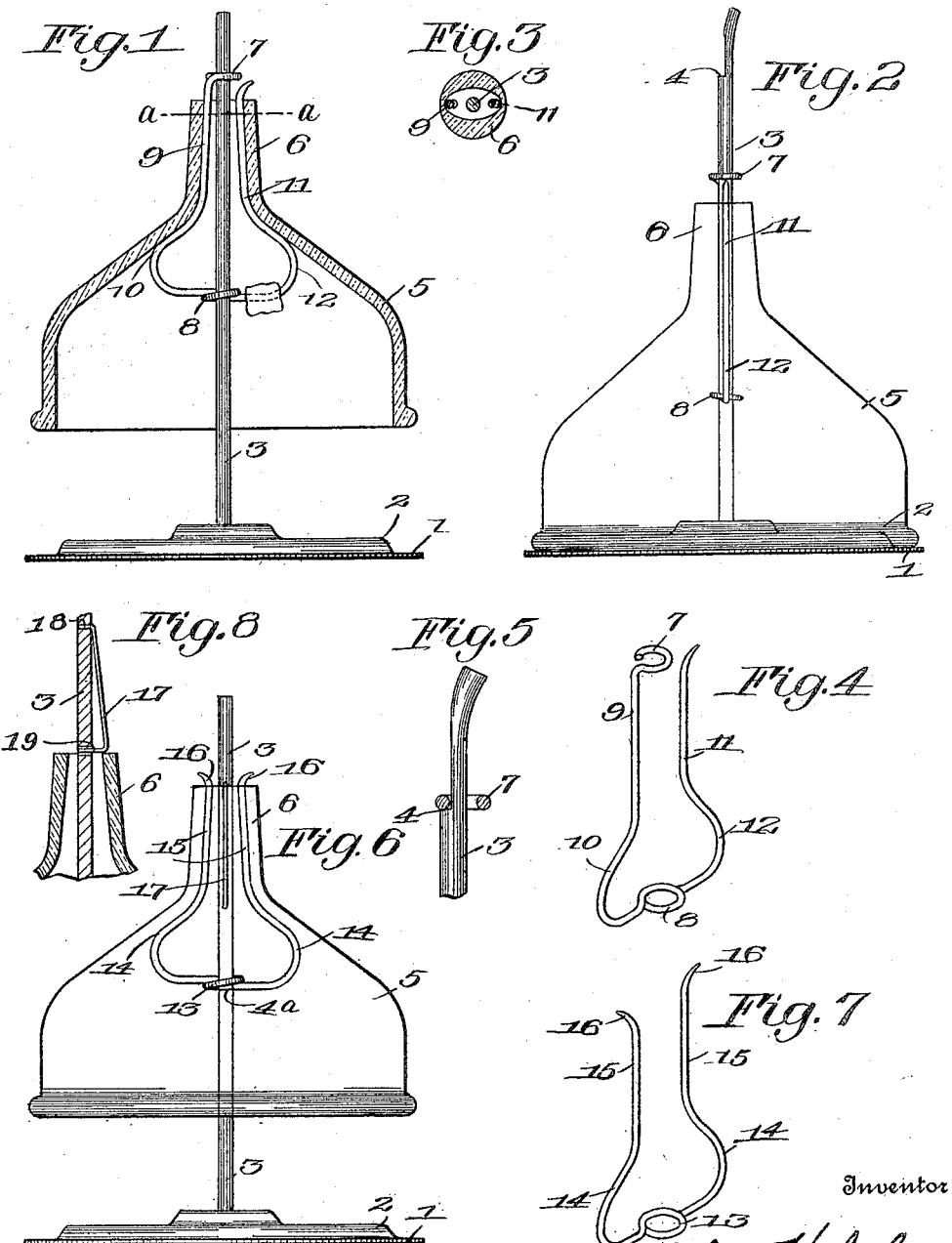

JOHN HEBERLING, OF ROCHESTER, NEW YORK.

ANIMAL-TRAP.

1,075,034.     Specification of Letters Patent.     Patented Oct. 7, 1913.

Application filed October 2, 1912. Serial No. 723,506.

*To all whom it may concern:*

Be it known that I, JOHN HEBERLING, of Rochester, in the county of Monroe and State of New York, have invented a new and useful Improvement in Animal-Traps, which improvement is fully set forth in the following specification and shown in the accompanying drawings.

The present invention relates to animal traps and an object of the same is to provide a construction which is sanitary in all respects, simple in operation, durable in use, and inexpensive to manufacture.

Another object of the invention is to provide a construction in which the animal will enter the trap without having to pass through a narrow or restricted opening and in this way will enter without fear.

To these and other ends the invention consists in certain parts and combinations of parts all of which will be hereinafter described, the novel features being pointed out in the appended claims.

In the drawings: Figure 1 is a vertical central section through one embodiment of the invention showing the trap set; Fig. 2 is a side elevation of the same embodiment showing the positions of the parts before setting; Fig. 3 is a horizontal section on the line $a$—$a$ Fig. 1; Fig. 4 is a detail view of the baiting means of the same embodiment and the parts by which it is carried; Fig. 5 is a detail view of a supporting shoulder of the same embodiment, showing the coöperation between this shoulder and the portion on the cup-like member engaging therewith; Fig. 6 is a side elevation of another embodiment of the invention, showing the same in set position; Fig. 7 is a detail perspective view of the baiting means and the parts by which it is carried as shown in Fig. 6; and Fig. 8 is a detail view of the locking means for holding the cup-like member and base together.

Referring to the embodiment of the invention shown in Figs. 1 to 5, 1 indicates a base formed from any suitable material but preferably sheet metal and having, if desired, a central struck-up portion forming an annular shoulder 2 near the rim. Preferably extending centrally from the base is a support or rod 3 which may be formed near its upper end and on one side thereof with a shoulder 4. Adapted for coöperation with the base to form a chamber is a member 5 which, preferably, is an inverted cup-like structure having an upwardly projecting and central reduced portion 6 open at its outer end and preferably formed of oval cross section. When in its lowermost position, as shown in Fig. 2, this cup-like structure rests on the base and abuts the shoulder 2 to prevent lateral movement on the base. In order to support the cup-like member 5 in spaced relation to the base 1, as shown in Fig. 1, such cup-like member may carry means for engaging with the shoulder 4 of the supporting rod 3. In this instance, this means comprises two rings 7 and 8 surrounding the rod 3 and held in spaced relation by a connecting portion 9 which is deflected outwardly at 10 so as to conform to the inner face of the cup-like structure and provide a shoulder for supporting the latter.

The baiting means is preferably carried by the member 5 in such a position that, when the animal touches the bait, the member 5 will shift and cause the ring 7, which is in engagement with the shoulder 4, to be disengaged from said shoulder, thus permitting the cup-like structure 5 to drop by gravity into engagement with the base 1. In this instance, the baiting means is an arm extending from the ring 8, having a portion 12 engaging within the cup-like structure 5, and a portion 11 extended upwardly through the reduced portion 6, its free end being pointed to permit the introduction of the bait on the arm.

In the embodiment shown in Figs. 6, 7 and 8, all the parts are the same except that the shoulder $4^a$, instead of being near the upper end of the standard 3, is near the center of the latter and the combined supporting and baiting means is of different construction, being composed of a ring 13 adapted to rest upon the shoulder $4^a$ and having two arms extending outwardly and upwardly therefrom, each of said arms having a shoulder portion 14 for engaging the inner face of the cup-like member 5 and a portion 15 extending upwardly and through the reduced portion 6, the free ends being pointed at 16 and being arranged on the exterior of the cup-like member, serving to permit the introduction of the bait onto the arms and the retention of the wire member within the cup-like member 5. The embodiment also has a locking device for holding the base and the cup-like member together. This device, in this instance, comprises a spring 17 having one end 18 rigidly secured to the post or upright 3, extending downwardly and outwardly from the secured end to provide an inclined portion and having its free end turned inwardly at 19 and loosely extended through an opening in the post or upright to provide a shoulder. In operation, when the member 5 drops, the upper end of the reduced portion 6 engages below the shoulder 19 and holds the cup-like member to the base until the inclined portion 17 is pressed inwardly by hand or otherwise when said member may be again raised.

In both embodiments, the cup-like member is supported in a raised portion on a shoulder from which it is disengaged when the animal attacks the bait, the member 5 being mounted to rotate for such disengagement and the bait being located eccentrically with reference to the axis of rotation so that the animal effects such rotation when it attacks the bait.

What I claim as my invention and desire to secure by Letters Patent is:

1. An animal trap comprising a support having a shoulder, a rotatable chambered member adapted to be supported on the shoulder of said support and to become disengaged therefrom by a rotary action, and baiting means carried by the chambered member and supporting the bait in such a manner that upon an attack by an animal the chambered member is rotated and disengaged from the support.

2. An animal trap comprising a base, a post extending upwardly from the base and provided with a shoulder, a rotatable cup-like member carrying a portion adapted to be supported upon the shoulder and to drop out of coöperation with the shoulder and permit the cup-like member to coöperate with the base to provide a chamber upon a rotary movement of said cup-like member, and baiting means coöperating with the cup-like member for effecting the dropping of said member.

3. An animal trap comprising a base, a post extending upwardly from the base and provided with a shoulder, a rotatable cup-like member having a centrally arranged opening through which the post extends, means carried by and rotatable with said cup-like member for coöperating with the shoulder on the post in order to support the cup-like member in spaced relation to the base but adapted, when the said cup-like member is rotated to become disengaged from the shoulder, to permit the cup-like member to drop into coöperation with the base, and baiting means coöperating with the cup-like member for effecting such dropping.

4. An animal trap comprising a supporting post provided with a shoulder, a rotatable cup-like member having a centrally arranged reduced portion open at its outer end, and means removably arranged within the cup-like member and having a portion coöperating with a shoulder on the post, said means being provided with a bait engaging device within the cup-like member.

5. An animal trap comprising a supporting post having a shoulder thereon, a chambered member, and a member supporting the chambered member and having a ring surrounding the post and adapted to rest on the shoulder, and a bait supporting arm extending from said member.

6. An animal trap comprising a supporting post provided with a shoulder, a rotatable cup-like member having a central opening through which the post extends, and a wire member bent to form a ring surrounding the post and adapted to rest upon the shoulder, said wire member being secured to the rotatable cup-like member to turn with the latter.

7. An animal trap comprising a supporting post provided with a shoulder, a rotatable cup-like member having a central opening through which the post extends, and a member removably engaged with the cup-like member but turning with the latter and having a portion for coöperation with the shoulder on the post, and also having baiting means carried thereby in such a position that when the bait is attacked by the animal the cup-like member is rotated.

8. An animal trap comprising a supporting post provided with a shoulder, a rotatable cup-like member having a central opening through which the post extends, and a member formed of wire, removably engaged with the cup-like member to turn therewith and having a ring portion surrounding the post to coöperate with the shoulder on the latter, and also having a baiting arm for securing the bait.

JOHN HEBERLING.

Witnesses:
HAROLD H. SIMMS,
ADA M. WHITMORE.

Copies of this patent may be obtained for five cents each, by addressing the "Commissioner of Patents, Washington, D. C."